(12) United States Patent
Takizawa

(10) Patent No.: US 6,657,680 B2
(45) Date of Patent: Dec. 2, 2003

(54) OPTICAL COMPONENT WITH FRAME MEMBERS DIRECTLY ATTACHED TO A PRISM BLOCK AND PROJECTOR CONTAINING THE SAME

(75) Inventor: Takeshi Takizawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 40 days.

(21) Appl. No.: 09/899,288

(22) Filed: Jul. 6, 2001

(65) Prior Publication Data

US 2002/0015119 A1 Feb. 7, 2002

(30) Foreign Application Priority Data

Jul. 10, 2000 (JP) ......................................... 2000-208444

(51) Int. Cl.[7] ............................................ G02F 1/1335
(52) U.S. Cl. ............................... 349/5; 349/58; 353/119
(58) Field of Search ............................... 353/119; 349/5, 349/58

(56) References Cited

U.S. PATENT DOCUMENTS

| | | | | |
|---|---|---|---|---|
| 5,868,485 A | * | 2/1999 | Fujimori et al. | ............. 353/119 |
| 5,978,054 A | | 11/1999 | Fujimori | ...................... 349/60 |
| 6,135,600 A | * | 10/2000 | Fujimori | ...................... 353/119 |
| 6,406,151 B1 | * | 6/2002 | Fujimori | ...................... 353/119 |
| RE37,836 E | * | 9/2002 | Fujimori et al. | ............. 353/119 |
| 6,488,380 B1 | * | 12/2002 | Fujimori | ...................... 353/119 |
| 6,491,399 B1 | * | 12/2002 | Fujimori | ...................... 353/33 |
| 6,530,665 B2 | * | 3/2003 | Takizawa et al. | ........... 353/119 |
| 6,587,167 B1 | * | 7/2003 | Fujimori et al. | .............. 349/58 |
| 2002/0131026 A1 | * | 9/2002 | Fujimori | ...................... 353/119 |

FOREIGN PATENT DOCUMENTS

| | | |
|---|---|---|
| JP | A 8-304739 | 11/1996 |
| JP | A 9-74523 | 3/1997 |
| JP | A 10-10994 | 1/1998 |
| JP | A 11-25345 | 1/1999 |

* cited by examiner

*Primary Examiner*—James Dudek
*Assistant Examiner*—T L Rude
(74) *Attorney, Agent, or Firm*—Oliff & Berridge, PLC

(57) ABSTRACT

The invention provides an optical component and a projector in which a light modulation device is reliably fixed relative to a prism, and in which the size of the prism can be reduced to the minimum size required from an optical point of view. Frame members are attached to a cross-dichroic prism, and retaining frames, which retain liquid crystal panels, are fixed to the frame members with fixing pins. Since it is not necessary to fix the fixing pins directly to the cross-dichroic prism, the cross-dichroic prism, having the minimum size required from an optical point of view, may be used. In addition, since a large fixing area is provided between the frame members and the fixing pins, the frame members and the fixing pins are fixed to each other with sufficient fixation strength. Accordingly, the liquid crystal panels may be reliably fixed relative to the cross-dichroic prism.

14 Claims, 12 Drawing Sheets

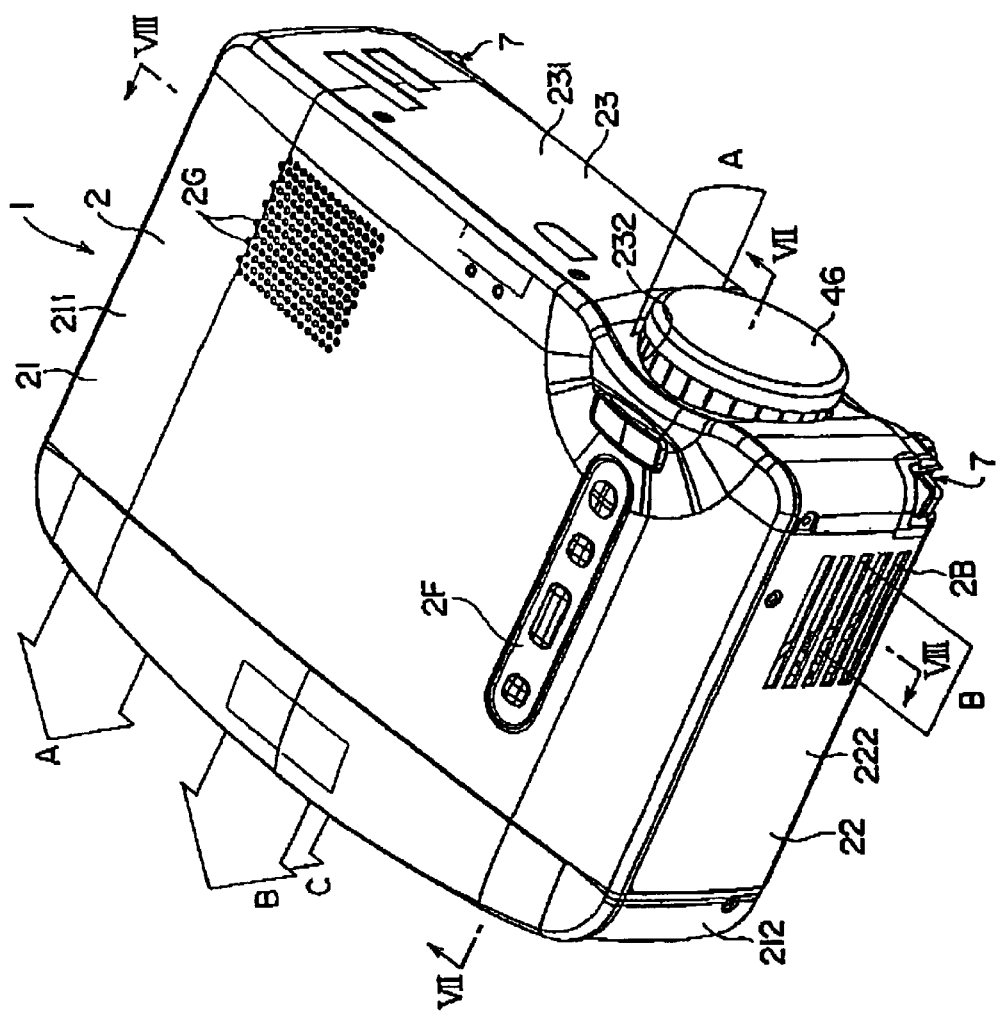
[FIG. 1]

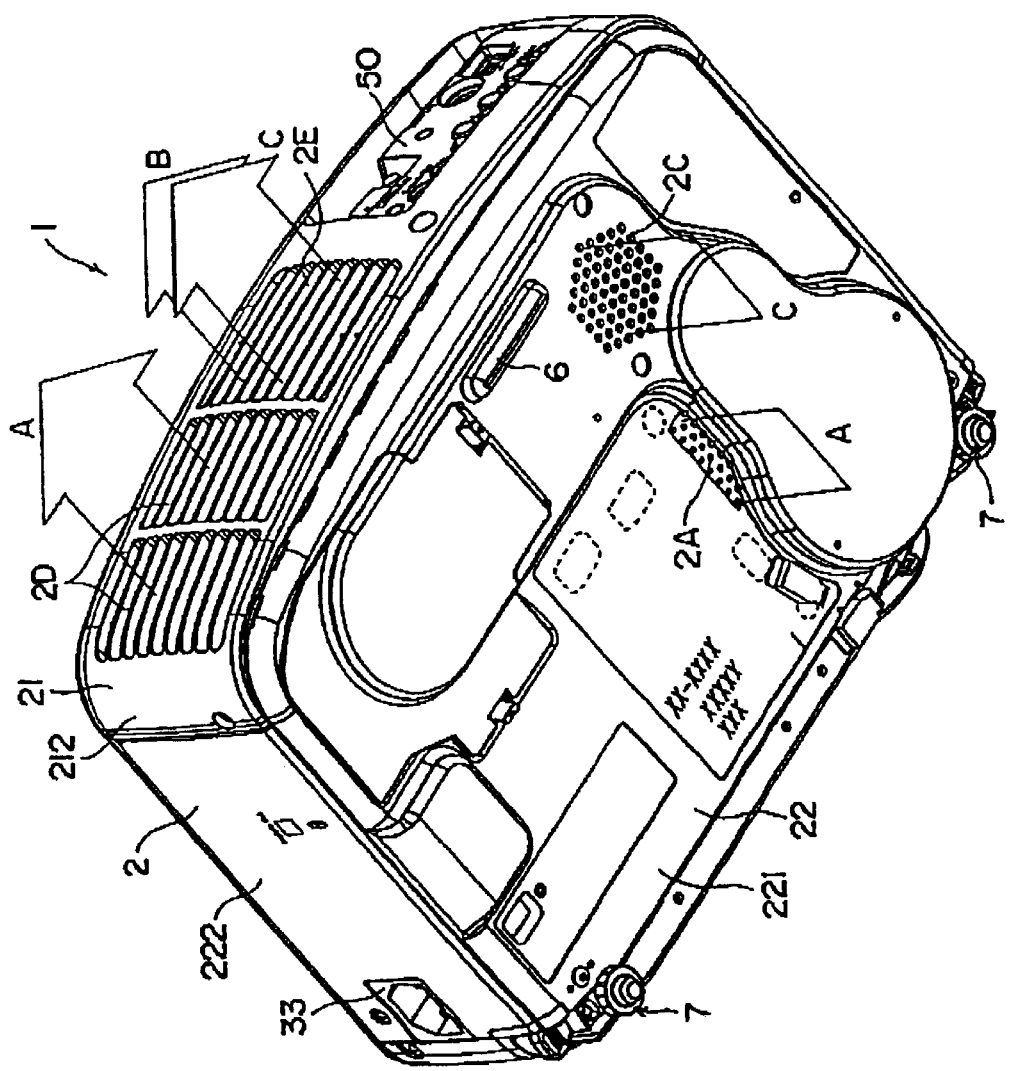
[FIG. 2]

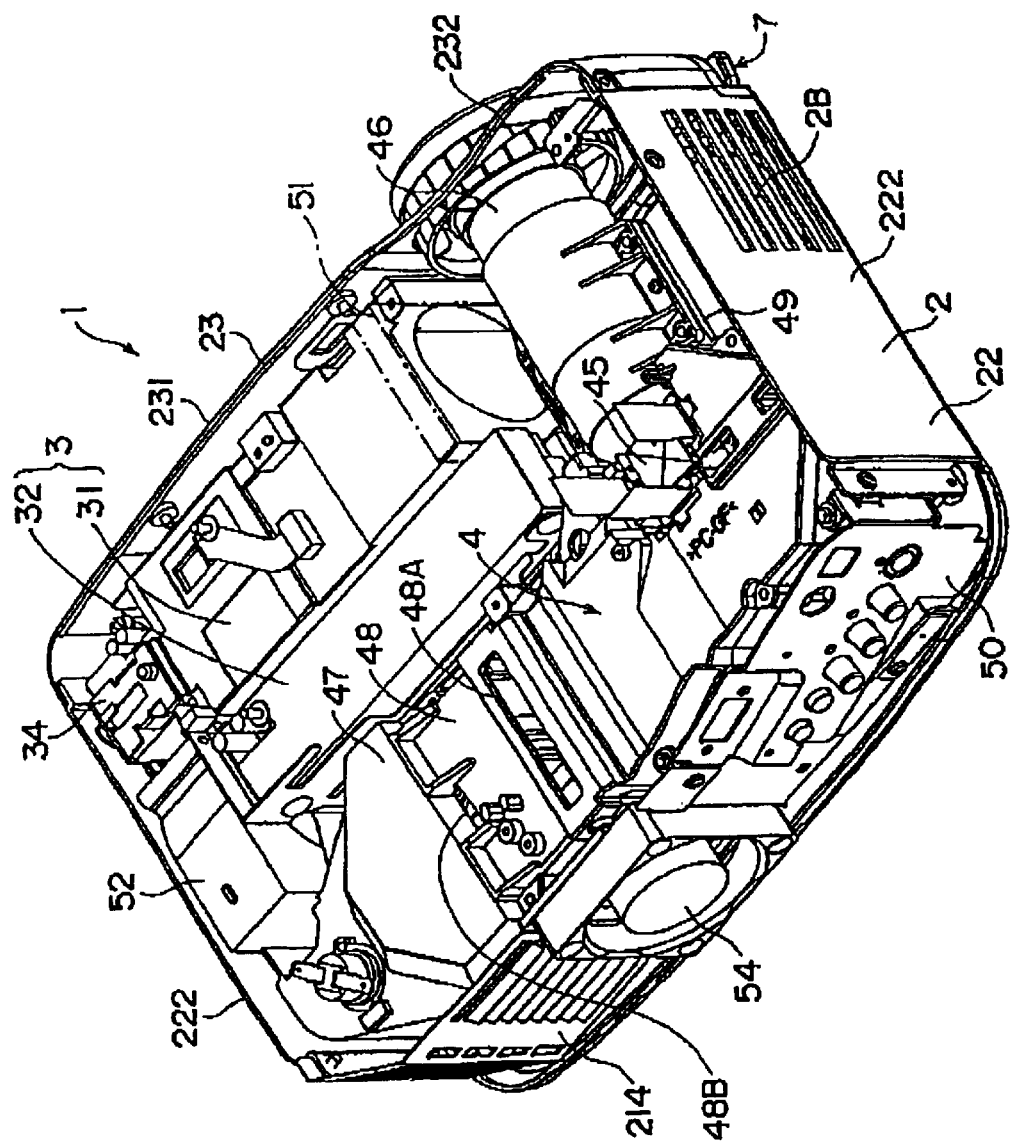
[FIG. 3]

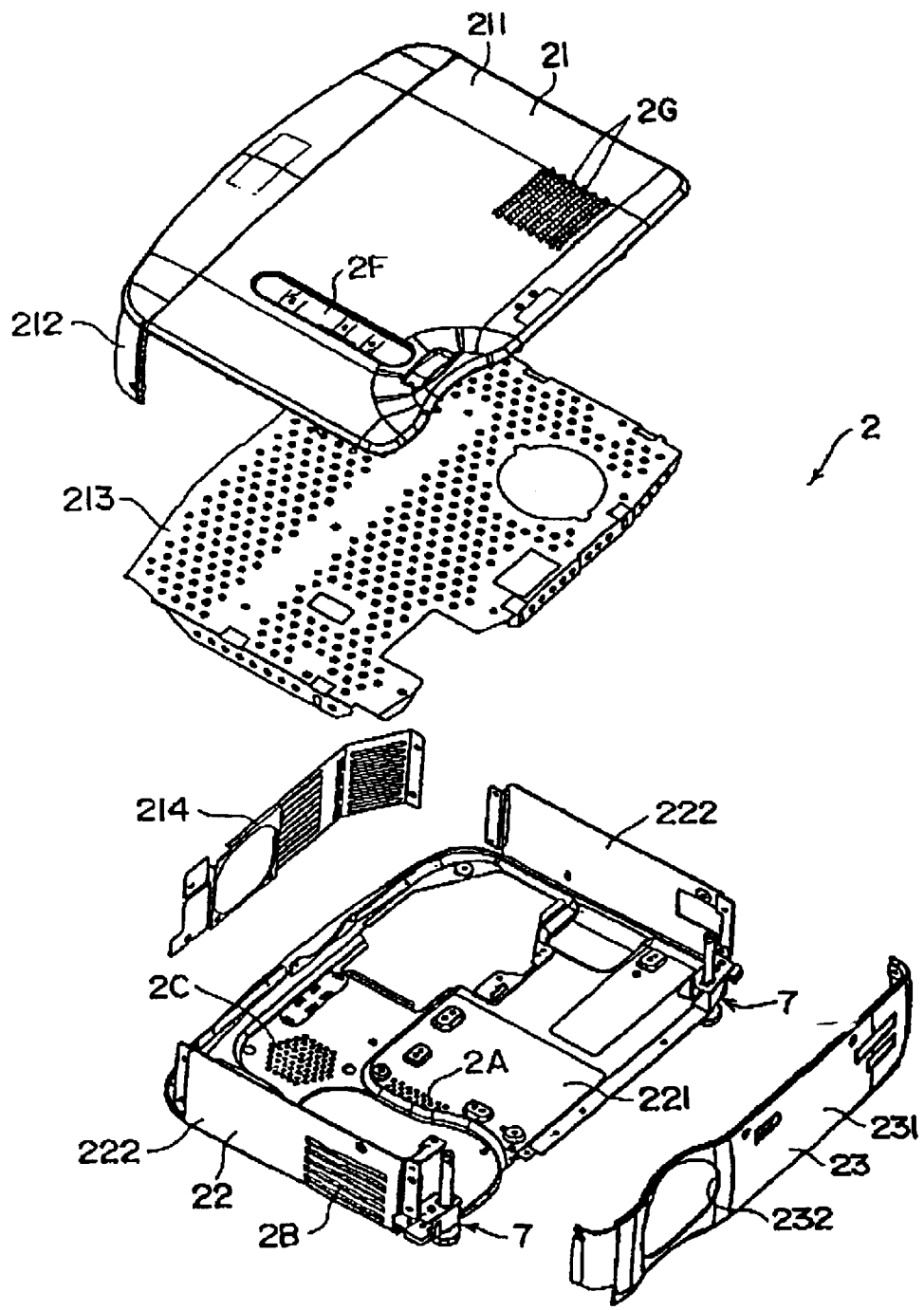
[FIG. 4]

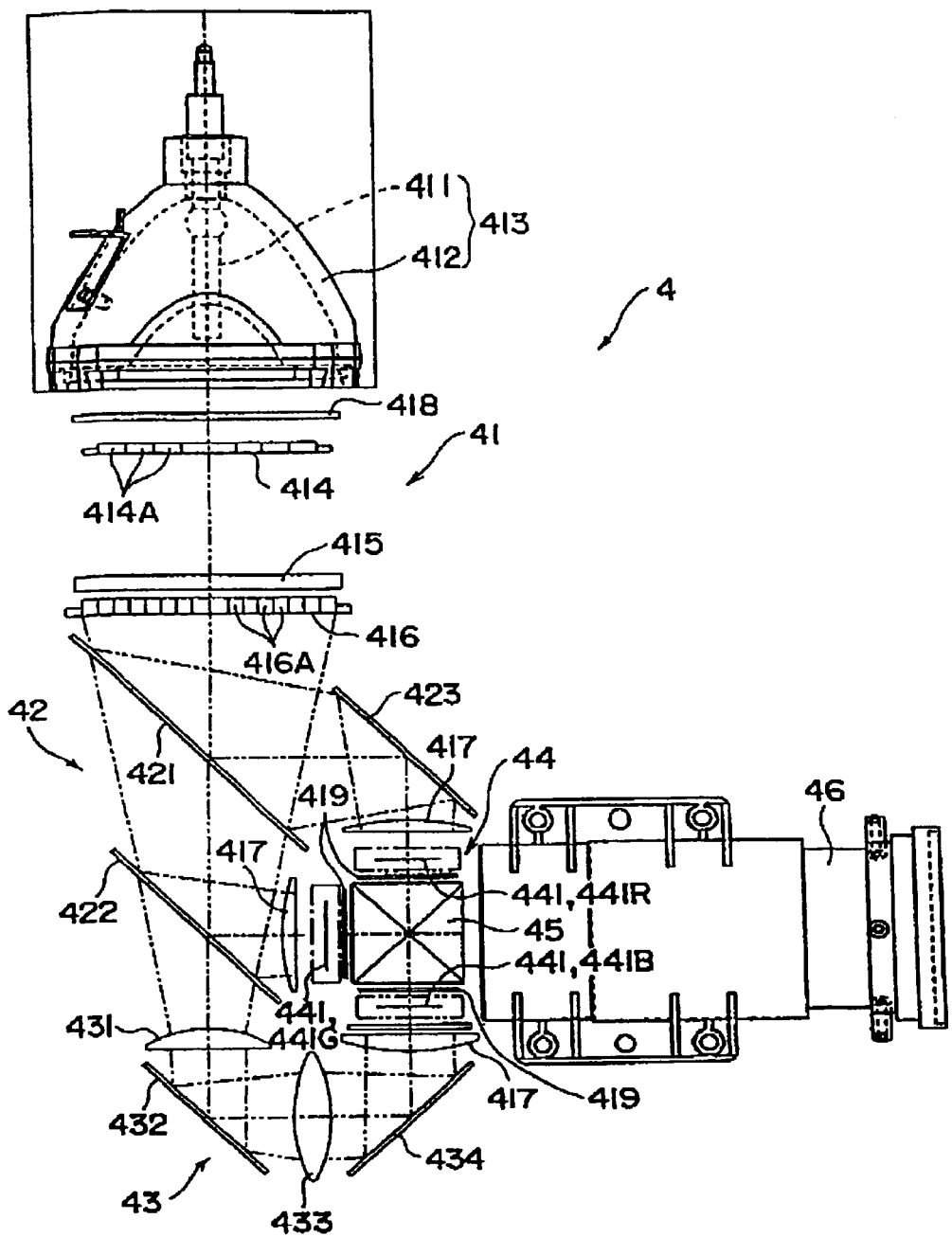
[FIG. 5]

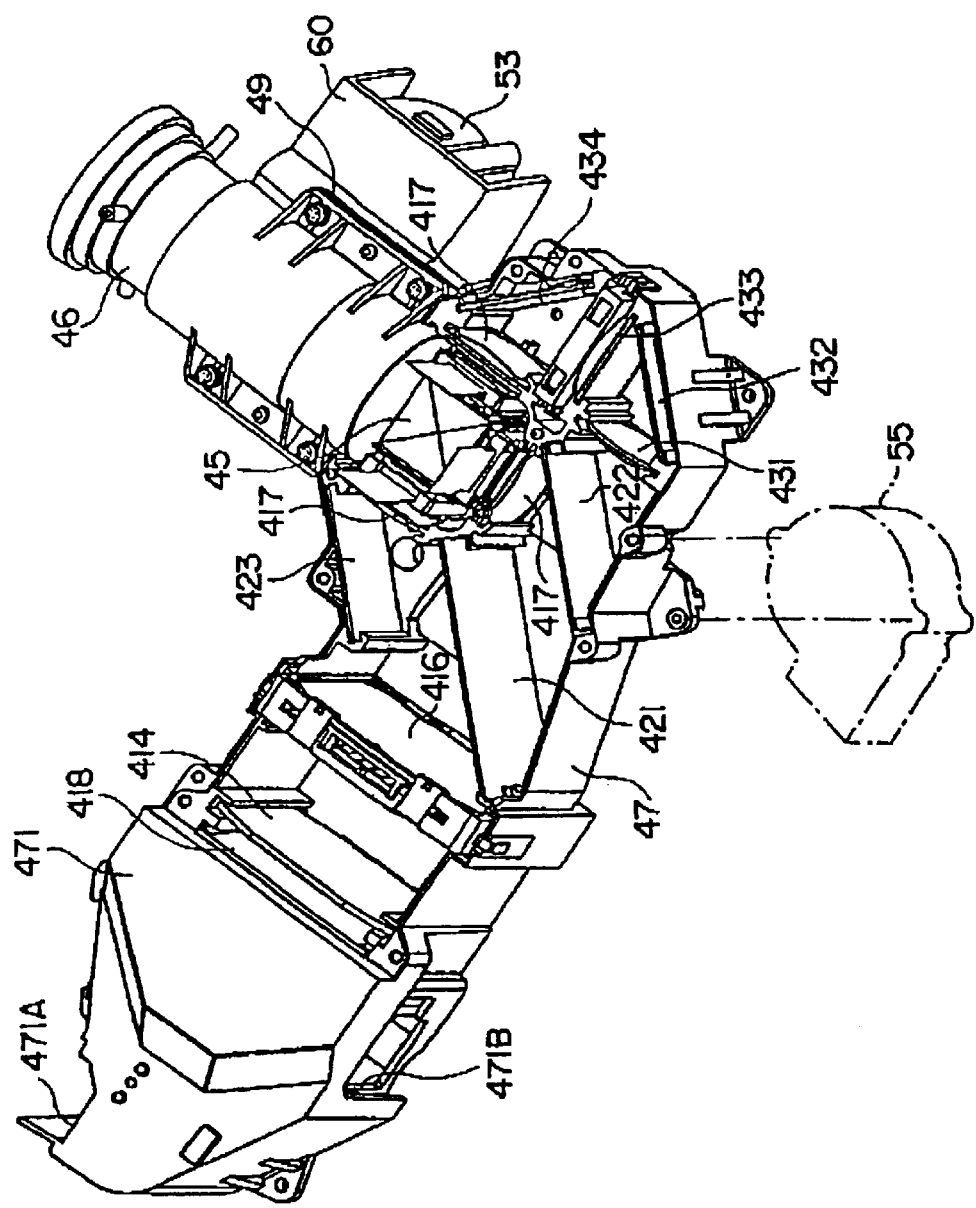
[FIG. 6]

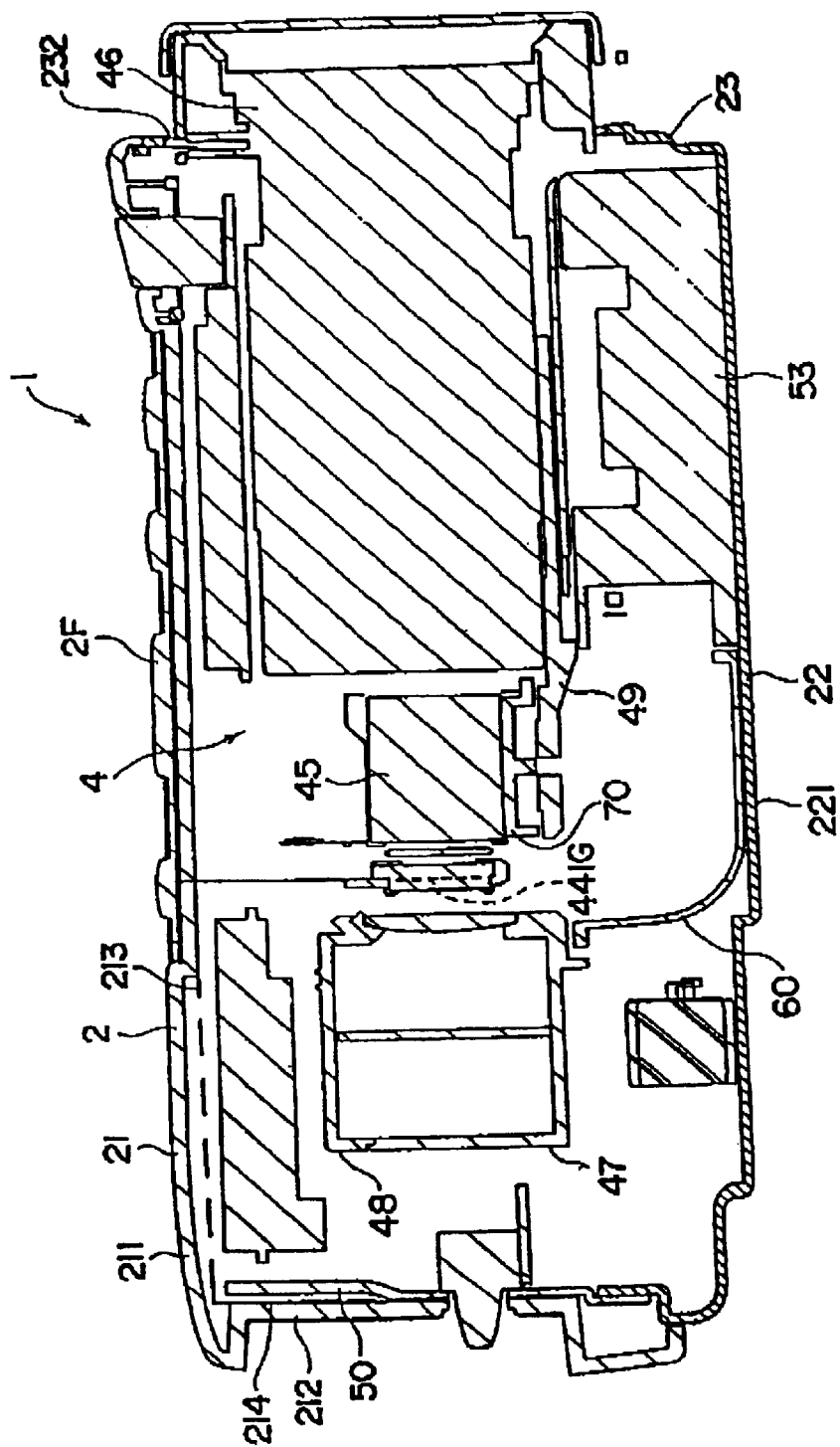
[FIG. 7]

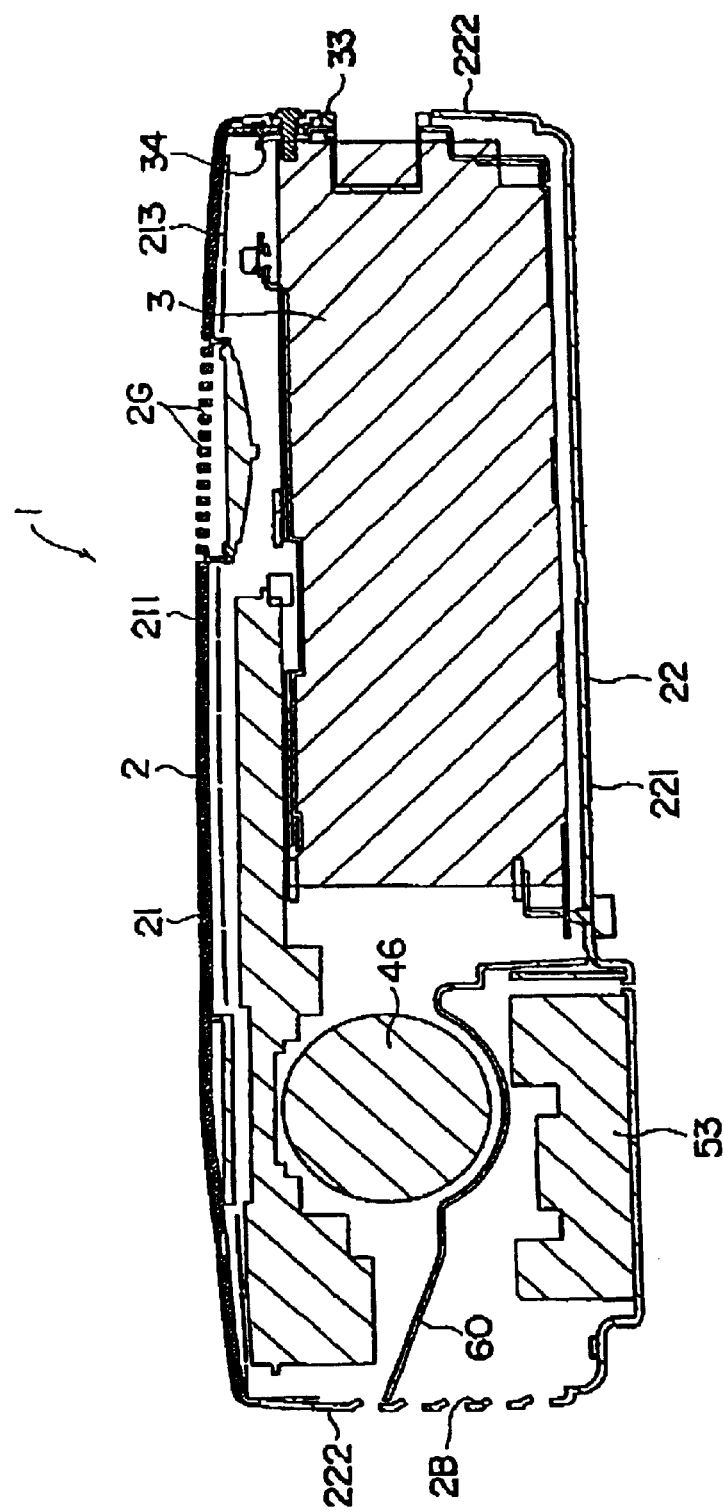
[FIG. 8]

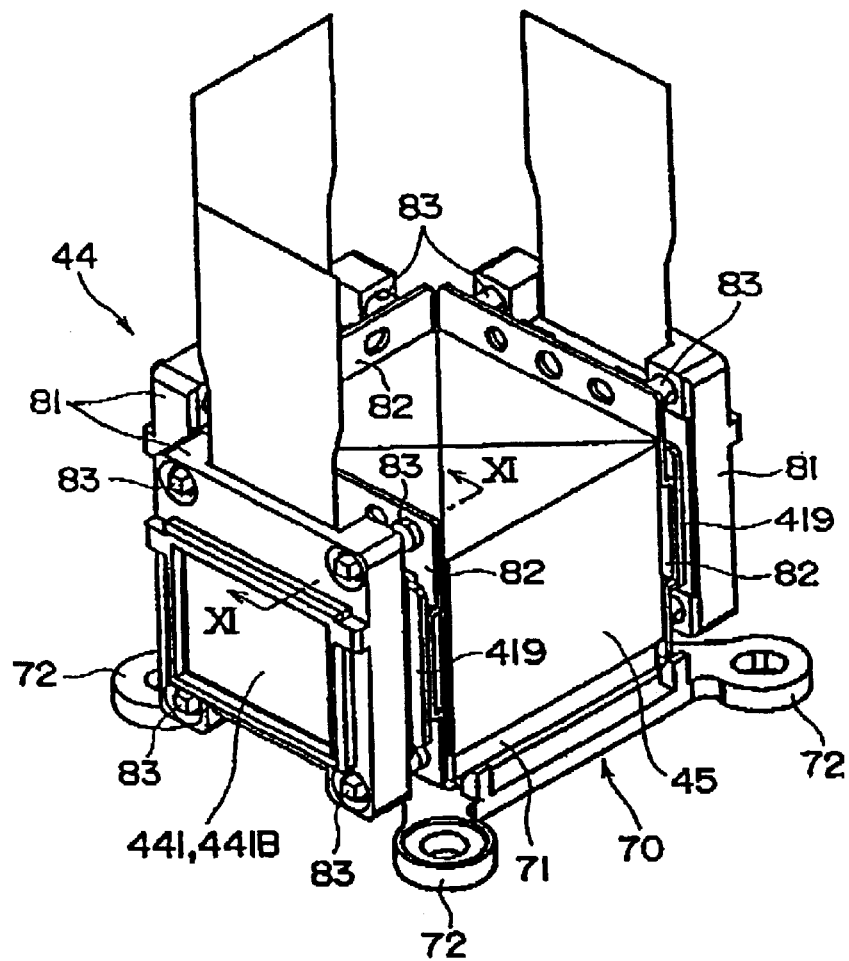
[FIG. 9]

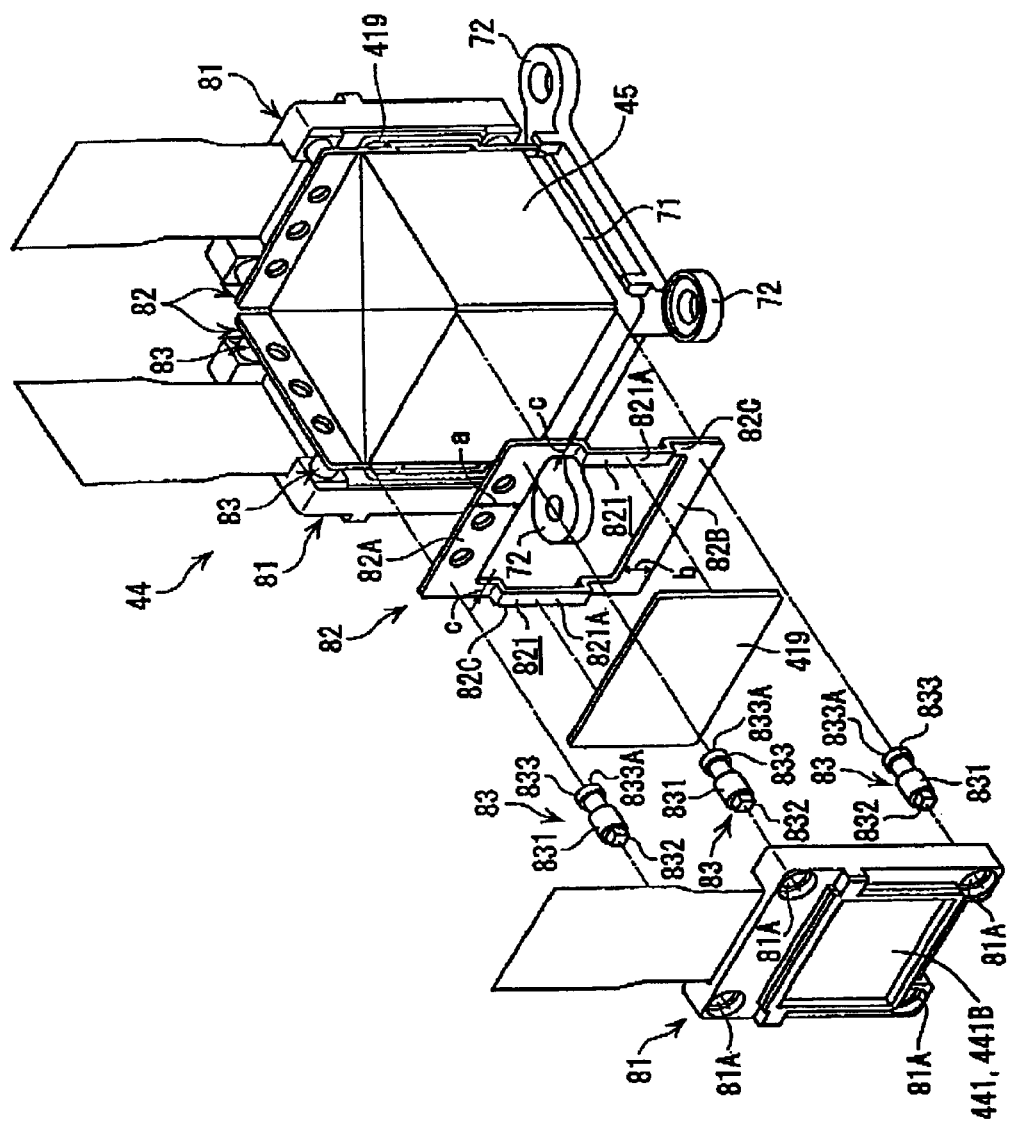
[FIG. 10]

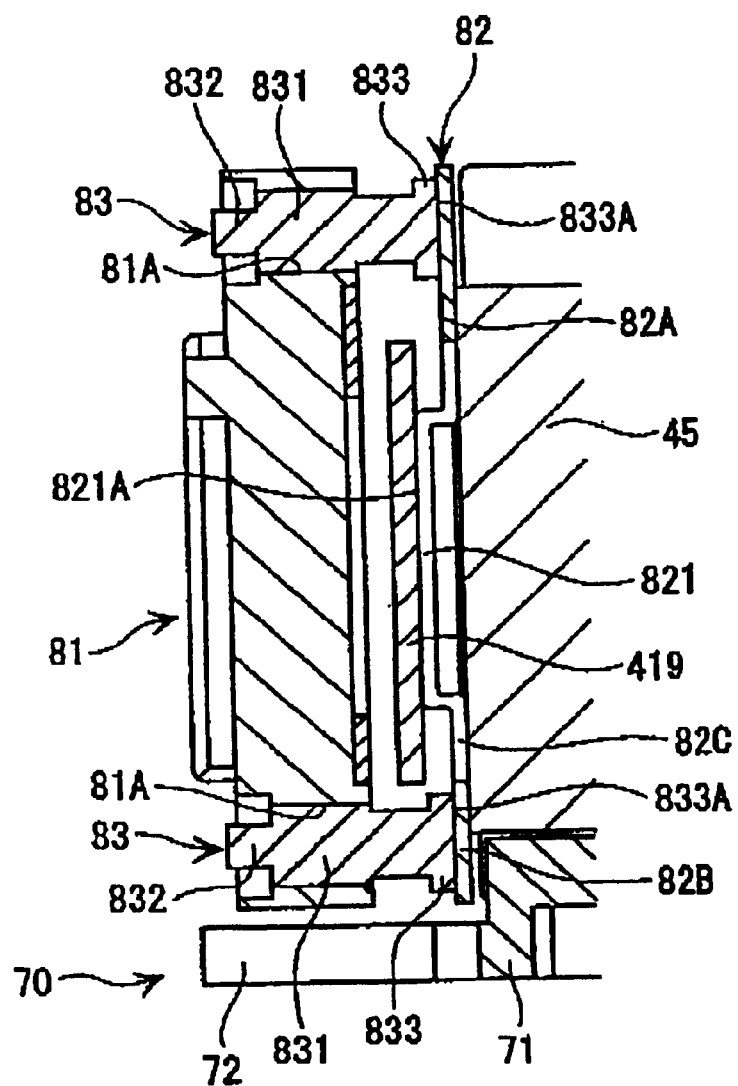
[FIG. 11]

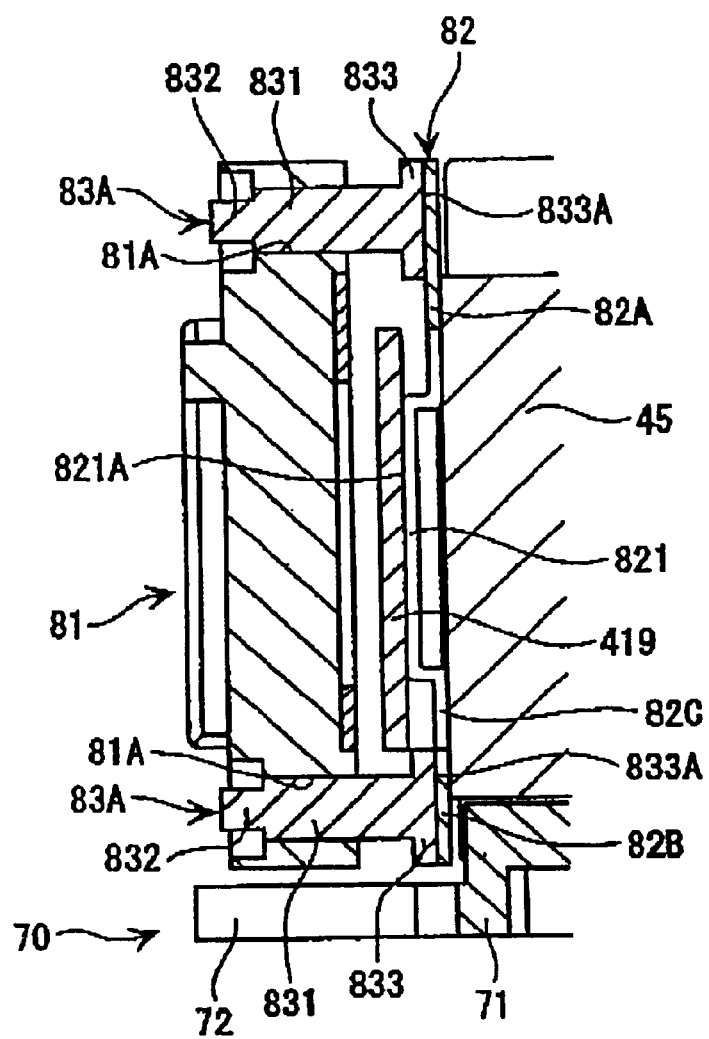
[FIG. 12]

OPTICAL COMPONENT WITH FRAME MEMBERS DIRECTLY ATTACHED TO A PRISM BLOCK AND PROJECTOR CONTAINING THE SAME

BACKGROUND OF THE INVENTION

1. Field of Invention

The present invention relates to optical components and projectors containing the optical components. More specifically, the present invention relates to an optical component including an electro-optical device, a retaining frame which retains the electro-optical device, a prism, and a fixing pin for fixing the retaining frame and the prism, and to a projector containing the optical component.

2. Description of Related Art

Recently, projectors have become increasingly common, and are used in, for example, presentations at in-house conferences or at business trips. In addition, the projectors are also used in technical review sessions in research and development departments, etc., for projecting enlarged images of CAD/CAM/CAE data, in various seminars or workshops, or in classes in schools adopting audiovisual education. Furthermore, the projectors are also used for aiding discussions regarding medical treatments or medical education by projecting medical images and data of CT scans, MRI, etc., or for effectively conducting exhibitions or events wherein many people gather, etc.

Since the projectors are used in various situations as described above, the projectors must comply with various different specifications and functions. Accordingly, projectors have been developed which are compact and light, which enhances portability. Projectors have also been developed to have high resolution and high luminance, which enhances image quality, and to be highly functional, which provides connections to digital devices or to mobile devices.

It is expected that the projectors will be used in even more situations. Thus, projectors having additional specifications and functions are also being developed in prospect of the new situations in which they might be used.

With respect to the types of projectors described above, a projector is known in the art which includes an electro-optical device which modulates a plurality of colored lights in accordance with image information, a cross-dichroic prism which synthesizes the lights modulated by the electro-optical device, and a projection lens which enlarges and projects the lights synthesized by the cross-dichroic prism.

In such a projector, in order to reduce the size thereof, and to make the construction thereof simple, three light modulation devices (for example, liquid crystal panels), which form the electro-optical device, are fixed to the cross-dichroic prism with fixing members therebetween. Such a construction is suggested in, for example, Japanese Unexamined Patent Application Publication No. 11-25345 (applied by the present Applicant). According to this publication, a retaining frame, which retains a light modulation device, is provided with holes at four corners thereof, and fixing pins are inserted through the holes and are fixed to the holes. The ends of the fixing pins are adhered directly on a side surface of the cross-dichroic prism, so that the light modulation device is fixed to the cross-dichroic prism.

In the above-described construction, however, the ends of the fixing pins are adhered directly on the side surface of the cross-dichroic prism, so that the side surface of the cross-dichroic prism must have areas on which the fixing pins are adhered. Thus, a problem arises that the size of the dichroic prism must be large enough to provide the adhesion areas. Accordingly, even though the construction of the cross-dichroic prism can be made simpler, the size thereof cannot be reduced. More specifically, the size of the cross-dichroic prism cannot be reduced to the minimum size required from an optical point of view.

In order to reduce the size of the cross-dichroic prism, the size of the adhesion areas between the cross-dichroic prism and the fixing pins may be set to a minimum value. However, when the size of the adhesion areas is set to the minimum value, the adhesion strength between the cross-dichroic prism and the fixing pins may not be sufficient, and thus the fixation strength between the cross-dichroic prism and the light modulation device may not be sufficient either.

SUMMARY OF THE INVENTION

It is therefore an object of the present invention to provide an optical component and a projector in which the light modulation device is reliably fixed relative to the prism, and in which the size of the prism can be reduced to the minimum size required from an optical point of view.

In order to attain the above-described object, an optical component according to the present invention is constructed as described below.

In accordance with the present invention, an optical component includes a light modulation device; a retaining frame which retains the light modulation device; a prism; a fixing pin that fixes the retaining frame to the prism; and a frame member which is attached to a surface of the prism. In addition, one end of the fixing pin is fixed to the retaining frame, and the other end of the fixing pin is fixed to the frame member.

Accordingly, the frame member is attached to the prism, and the retaining frame, which retains the light modulation device, is attached to the frame member with the fixing pin. Thus, it is not necessary to fix the fixing pin directly to the prism, and the prism is not required to provide an area for fixing the fixing pin. Accordingly, the size of the prism may be reduced to the minimum size required from an optical point of view, and the prism may be made to be small.

In addition, since the fixing pin is fixed to the frame member, the area for fixing the fixing pin may be increased, irrespective of the size of the prism, by increasing the size, especially the width, of the frame member. Accordingly, sufficient fixation strength may be provided between the fixing pin and the frame member, and the light modulation device is reliably fixed relative to the prism.

In accordance with another aspect of the invention, the peripheral size of the frame member is larger than the surface of the prism to which the frame member is attached.

Since the peripheral size of the frame member is larger than the surface of the prism, the frame member only slightly covers the surface of the prism, and the area for fixing the fixing pin may be increased irrespective of the size of the prism. Thus, the fixing pin is reliably fixed relative to the prism, so that the light modulation device is also reliably fixed relative to the prism.

In accordance with another aspect of the invention, the retaining frame is formed of a synthetic resin, the prism is formed of an optical glass, and the frame member is formed of a metal.

The retaining frame, which is formed of a synthesized resin, and the prism, which is formed of an optical glass, are commonly used in optical devices such as projectors. Thus, the optical component may be constructed economically. In addition, since the frame member is formed of a metal, the frame member may be easily formed into a desired shape by using sheet metal, etc.

Furthermore, when the optical component is contained in, for example, a projector, the retaining frame and the prism may expand due to heat which occurs from a light source. The retaining frame is often formed of a plastic, and has a larger coefficient of thermal expansion compared to the prism. Thus, in the conventional optical component, there is a risk in that the retaining frame will expand at a larger rate compared to the prism while the projector is being used. In such a case, the relative position between the retaining frame and the prism will be changed, so that the relative position between the light modulation device and the prism will also be changed. In the present invention, the retaining frame, which is formed of a synthetic resin, and the prism, which is formed of an optical glass, are connected to each other via the frame member, which is formed of a metal having a coefficient of thermal expansion that is between the coefficients of thermal expansion of the synthetic resin and glass. Thus, even if heat occurs when the projector is used, any impact caused by the difference in coefficients of thermal expansion between the prism and the retaining frame may be compensated for to some extent by the frame member. Accordingly, the change in the relative position between the retaining frame and the prism due to the difference in coefficients of thermal expansion may be suppressed.

In accordance with another aspect of the invention, the frame member is provided with a film-receiving portion to which an optical film is attached.

Since the frame member is provided with the film-receiving portion, the optical film may be easily attached to the frame member. The optical film may be, for example, a retardation film, a polarizing film, or a wide view angle film.

In accordance with another aspect of the invention, an air gap is provided between a surface of the film-receiving portion, to which the optical film is attached, and the surface of the prism, to which the frame member is attached.

Since the air gap is provided between the surface of the film-receiving portion of the frame member, to which the optical film is attached, and the surface of the prism, the optical film may be disposed relative to the prism with a predetermined clearance therebetween. Accordingly, the air permeability between the optical film and the prism may be ensured.

In accordance with another aspect of the invention, an optical component includes a light modulation device; a retaining frame which retains the light modulation device; a prism; and a fixing pin that fixes the retaining frame to the prism. In addition, one end of the fixing pin is fixed to the retaining frame, and another end of the fixing pin is fixed to the frame member. The cross-section of the other end of the fixing pin is larger than the cross-section of the one end of the fixing pin.

Accordingly, the cross section of the other end of the fixing pin, which is adhered relative to the prism, is set to a relatively large value. More specifically, the end surface, which is the adhesion surface, at the other end of the fixing pin is set to a relatively large value. Thus, the adhesion strength between the fixing pin and the prism is more reliably ensured. The other end of the fixing pin may be adhered directly on the prism, or be adhered on the frame member as discussed above, as long as it is adhered relative to the prism.

On the other hand, a projector according to the present invention has the following construction in order to attain the above-described object.

In accordance with the invention, a projector includes a light modulation device which modulates a plurality of colored lights in accordance with image information; a prism which synthesizes the lights modulated by the light modulation device; and an optical component as discussed above. The lights synthesized by the prism are enlarged and projected so as to form a projection image.

Since the projector includes the optical component as discussed above, the adhesion strength between the prism and the fixing pin is ensured, and the size of the prism may be reduced. Accordingly, the size of the projector may also be reduced.

In accordance with another aspect of the invention, the projector further includes a power source which supplies electricity to the light modulation device.

Since the projector is provided with the power source which supplies electricity to the light modulation device, the light modulation device is easily supplied with electricity.

BRIEF DESCRIPTION OF THE DRAWINGS

FIG. 1 is a perspective view of the entire body of a projector according to an embodiment of the present invention as viewed from above the projector;

FIG. 2 is a perspective view of the entire body of the projector as viewed from below the projector;

FIG. 3 is a perspective view of the interior of the projector;

FIG. 4 is an exploded perspective view of an exterior housing according to the embodiment of the present invention;

FIG. 5 is a plan view which schematically shows optical systems of the projector;

FIG. 6 is a perspective view of a component of an optical unit of the projector;

FIG. 7 is a longitudinal sectional view of FIG. 1, which is taken along plane VII—VII;

FIG. 8 is a longitudinal sectional view of FIG. 1, which is taken along plane VIII—VIII;

FIG. 9 is a perspective view of an optical component according to the embodiment of the present invention;

FIG. 10 is an exploded perspective view of the optical component;

FIG. 11 is a longitudinal sectional view of FIG. 9, which is taken along plane XI—XI; and FIG. 12 is a schematic diagram which shows a modification of the present invention.

DETAILED DESCRIPTION OF PREFERRED EMBODIMENTS

An embodiment of the present invention will be described below in conjunction with the accompanying drawings.

1. Basic Construction of Projector

FIG. 1 is a perspective view of the entire body of a projector 1 as viewed from above the projector, and FIG. 2 is a perspective view of the entire body of the projector 1 as viewed from below the projector. FIG. 3 is a perspective view of the interior of the projector 1.

With respect to FIGS. 1 to 3, the projector 1 includes an exterior housing 2 which has a rectangular parallelepiped box-like shape, a power supply unit 3 installed inside the exterior housing 2, and an L-shaped optical unit 4 which is also installed inside the exterior housing 2.

As shown in FIG. 4, the exterior housing 2 includes an upper case 21 which is formed of a synthetic resin, a lower case 22 which is formed of a metal such as aluminum, and a front case 23 which is also formed of a metal such as aluminum. The upper case 21, the lower case 22, and the front case 23 are fixed to each other with screws.

The upper case 21 includes a top plate 211 and a rear plate 212, which are integrally formed with each other.

A first electromagnetic shielding member 213, which is constructed of an aluminum plate in which many holes are formed by punch processing, is disposed at the inner side of the top plate 211 in a removable manner. In addition, a second electromagnetic shielding member 214, which is also constructed of an aluminum plate, is disposed at the inner side of the rear plate 212 of the upper case 21. The second electromagnetic shielding member 214 is fixed to the lower case 22 by screws.

The lower case 22 includes a bottom plate 221 and a pair of opposing side plates 222, which are integrally formed with each other. The bottom plate 221 and the side plates 222 are formed by bending an aluminum plate, etc., which is processed by using a pressing device, a machining center, etc., to have a predetermined shape.

The bottom plate 221 is provided with height adjusting members 7 at both edges in the front region thereof. The height adjusting members 7 are used for controlling the inclination of the entire body of the projector 1 and thereby adjusting the position of the projected image. In addition, a foot portion 6 (FIG. 2), which is formed of a resin, is provided at the center in the rear region of the bottom plate 221.

The front case 23 serves as a front plate 231 of the exterior housing 2, and is also formed by bending or drawing an aluminum plate, etc., which is processed by using a pressing device, a machining center, etc., to have a predetermined shape. The front case 23 is provided with a circular opening 232 which corresponds to a projection lens 46. The periphery of the circular opening 232 is curved inward by drawing processing.

The exterior housing 2 is provided with air intakes 2A, 2B and 2C for taking in cooling air, air outlets 2D and 2E for expelling cooling air, a control panel 2F, multiple holes 2G formed at a position corresponding to a speaker, etc. In addition, various connectors for the interface are exposed at the rear of the exterior housing 2. A driver board and other boards, to which the connectors are mounted, are supported by an aluminum plate 50 which covers an opening formed at the rear of the exterior housing. The aluminum plate 50 also serves as an electromagnetic shielding plate.

The power supply unit 3 includes a main power supply 31 which is disposed at the front region in the exterior housing 2 (FIG. 3) as a power supply, and a ballast 32 which is disposed in the rear region of the main power supply 31. The main power supply 31 receives electric power through a power supply cable and supplies the electric power to the ballast 32, a driver board (not shown), etc. The main power supply 31 includes an inlet connector 33 (FIG. 2) in which the power supply cable is inserted, an aluminum frame 34 which surrounds the inlet connector 33 (FIG. 3), and a power supply circuit (not shown), etc. The main power supply 31 also supplies electricity to liquid crystal panels 441, which will be described below, via the driver board (not shown).

The ballast 32 supplies electric power mainly to a light source lamp 411 (FIG. 5) in the optical unit 4, and includes a lamp driving circuit.

As shown in FIG. 5, the optical unit 4 optically processes a luminous flux emitted from the light source lamp 411, and forms an optical image which corresponds to image information. The optical unit 4 includes an integrator illumination optical system 41, a color separation optical system 42, a relay optical system 43, an electro-optical device 44, a cross-dichroic prism 45 formed of an optical glass which serves as a color-synthesizing optical system, and the projection lens 46 which serves as a projection optical system.

2. Detailed Construction of Optical Systems

With reference to FIG. 5, the integrator illumination optical system 41 is provided for uniformly illuminating the image forming areas of the liquid crystal panels 441, which serves as three light modulation devices forming the electro-optical device 44. The liquid crystal panels 441 will be denoted below by 441R, 441G and 441B in accordance with the color of the light. The integrator illumination optical system 41 includes a light source device 413, a UV filter 418, a first lens array 414, a polarization converter 415, and a second lens array 416.

The light source device 413 forming the integrator illumination optical system 41 includes the light source lamp 411 which serves as a radial light source and emits radial light, and a reflector 412 which reflects the radial light emitted by the light source lamp 411. A halogen lamp, a metal halide lamp, and a high-pressure mercury lamp are often used as the light source lamp 411.

The first lens array 414 includes small lenses 414A which have an approximately rectangular shaped contour, and which are arranged in the form of a matrix. Each of the small lenses 414A divides the luminous flux, which is emitted from the light source lamp 411 and passes through the UV filter 418, into a plurality of sub-beams. The contours of the small lenses 414A have a shape similar to the shape of the image forming areas of the liquid crystal panels 441. For example, when the aspect ratio (the ratio between the lateral size and the longitudinal size) of the image forming areas is 4:3, the aspect ratio of the small lenses 414A is also 4:3.

The second lens array 416 is constructed similarly to the first lens array 414, and includes small lenses 416A which are arranged in the form of a matrix. The second lens array 416 condenses the light from the first lens array 414.

The polarization converter 415 is disposed between the first lens array 414 and the second lens array 416, and converts the light from the first lens array 414 into one type of polarized light. The efficiency of using the light at the electro-optical device 44 is increased due to the polarization converter 415. More specifically, the sub-beams, which are converted into the polarized light, are condensed at the condenser lenses 417, and eventually reach the liquid crystal panels 441R, 441G, and 441B in the electro-optical device 44. In the liquid crystal panels 441 of the type which modulates polarized lights used in the projector 1 (electro-optical device 44) of the present embodiment, only one of the two types of polarized lights (S wave and P wave) forming the light can be used. Thus, normally, approximately half of the light emitted from the light source lamp 411 is not used. Accordingly, in the present embodiment, the polarization converter 415 is provided for converting the light emitted from the light source lamp 411 into one type of polarized light, so as to enhance the efficiency of using the light at the electro-optical device 44. Such a polarization converter 415 is disclosed in, for example, Japanese Unexamined Patent Application Publication No. 8-304739.

The color separation optical system 42 includes two dichroic mirrors 421 and 422 and a reflection mirror 423. In the color separation optical system 42, the dichroic mirrors 421 and 422 split the sub-beams, which are emitted from the integrator illumination optical system 41, into three colored lights of red, green, and blue.

The relay optical system 43 includes an entrance lens 431, a relay lens 433, and reflection mirrors 432 and 434, and serves to transfer the blue-colored light, which is split by the color separation optical system 42, to the liquid crystal panel 441B.

The electro-optical device 44 includes the three liquid crystal panels 441R, 441G, and 441B, which are formed of, for example, polysilicon TFTs as switching elements. In addition, visual angle compensating films 419 are disposed at the exit surfaces of the liquid crystal panels 441R, 441G and 441B. Each of the colored lights split by the color separation optical system 42 is modulated in accordance with the image information, so that an optical image is formed.

The cross-dichroic prism 45 synthesizes the images, which are emitted from the three liquid crystal panels 441R, 441G and 441B, and forms a color image. In the present embodiment, the size of the cross-dichroic prism 45 is at the minimum size required from an optical point of view. The cross-dichroic prism 45 includes a dielectric multilayer film which reflects the red-colored light and a dielectric multi-layer film which reflects the blue-colored light, which are disposed in a letter-X shape along the interfaces of four right-angle prisms. The three colored lights are synthesized by the dielectric multilayer films, and the color image obtained in the cross-dichroic prism 45 is emitted from the projection lens 46, and is extended and projected on a screen.

An optical component according to the present invention is constructed with the electro-optical device 44 and the cross-dichroic prism 45.

As shown in FIG. 6, the above-described optical systems 41 to 45 are contained in a inner casing 47 made of synthetic resin. The inner casing 47 is provided with a light source protecting member 471 which covers the light source device 413, and with slits in which the above-described optical components 414 to 418, 421 to 423, and 431 to 434 are fitted from the upper side by sliding. The polarization converter 415 and the second lens array 416 are united with each other and are fitted in a slit. A cover 48 as shown in FIG. 3 is provided to cover the inner casing 47.

A manner in which the electro-optical device 44 and the cross-dichroic prism 45, which form the optical components according to the present invention, are attached to the inner casing 47 will be described below.

The cross-dichroic prism 45, to which the liquid crystal panels 441R, 441G and 441B are attached, is fixed to a light exit portion 49 of the inner casing 47 at an end thereof. In addition, the projection lens 46 is fixed to a flange which is formed along a semicylindrical portion at the other end of the light exit portion 49.

3. Cooling Construction

With reference to FIGS. 1 to 3, the projector 1 is provided with a first cooling system A, a second cooling system B, and a third cooling system C. In the first cooling system A, cooling air is taken in through the region at the side of the projection lens 46 and through the air intake 2A formed in the bottom plate 221 of the exterior housing 2, and is expelled through the air outlet 2D. In the second cooling system B, cooling air is taken in through the air intake 2B formed in one of the side plates 222 of the exterior housing 2, and is expelled through the air outlet 2E. In the third cooling system C, cooling air is taken in through the air intake 2C formed in the bottom plate 221 of the exterior housing 2, and is expelled through the air outlet 2E.

In the first cooling system A, an axial intake fan (shown in FIG. 3 by a dotted chain line) 51 is provided at the side of the main power supply 31 near the projection lens 46. In addition, a first sirocco fan 52 is provided at the side of the ballast 32 near the light source device 413.

Cooling air is taken in by the axial intake fan 51 through the region at the side of the projection lens 46 and through the air intake 2A. The cooling air flows toward the first sirocco fan 52 while it cools the main power supply 31 and the ballast 32, and is drawn into the first sirocco fan 52. Then, the cooling air is ejected by the first sirocco fan 52, flows into the light source protecting member 471 through an opening 471A formed in the inner casing 47 for taking in air, and cools the light source device 413 from the rear thereof. Then, the cooling air is expelled through an opening 471B (FIG. 6) formed in the inner casing 47 for expelling air, and eventually flows out of the exterior housing 2 through the air outlet 2D.

As shown in FIGS. 7 and 8, in the second cooling system B, a second sirocco fan 53 is provided below the projection lens 46. The second sirocco fan 53 is disposed inside a duct member 60 (FIG. 6) which leads the cooling air from the air intake 2B to the lower side of the electro-optical device 44.

Cooling air, which is taken in through the air intake 2B, is led through the duct member 60, is drawn into the second sirocco fan 53, is ejected along the bottom plate of the exterior housing 2, and cools the electro-optical device 44. Then, the cooling air flows toward an axial exhaust fan 54 provided on the rear plate 214 while it cools the driver board (not shown), which is disposed above the optical unit 4, and is expelled out through the air outlet 2E by the axial exhaust fan 54.

As shown in FIG. 6 by the dotted chain line, in the third cooling system C, a third sirocco fan 55 is provided at a position corresponding to the air intake 2C formed in the bottom plate 221 of the exterior housing 2 below the inner casing 47. The size of the holes in the air intake 2C is reduced as much as possible to prevent dust and dirt, from the surrounding environment in which the projector 1 is set, from flowing inside of the projector.

Cooling air is drawn in by the third sirocco fan 55 through the air intake 2C, and is ejected through a duct-shaped region formed between the bottom plate 221 of the exterior housing 2 and the inner casing 47 toward the light source device 413. Then, the cooling air flows through an opening (not shown) formed in the inner casing 47 for taking in air at a position corresponding to the integrator illumination optical system 41. The cooling air cools the first lens array 414, the unit including the polarization conversion element 415 and the second lens array 416, and the UV filter 418 which form the integrator illumination optical system 41 from the bottom to the top. The cooling air is then expelled through openings 48A and 48B (FIG. 3) formed in the cover 48, and is eventually expelled out through the air outlet 2E by the axial exhaust fan 54 provided at the rear plate 214.

4. Construction of Optical Components

As shown in FIGS. 6 and 9, in the optical component constructed with the electro-optical device 44 and the cross-dichroic prism 45, the electro-optical device 44 is supported by the cross-dichroic prism 45. In addition, the cross-dichroic prism 45 is attached to the light exit portion 49 (FIG. 7) of the inner casing 47 via a supporting member 70 which supports the cross-dichroic prism 45. The supporting member 70 includes a mounting portion 71 that receives the cross-dichroic prism 45 and four guiding-and-fixing portions 72 that guide and fix the mounting portion 71 to the light exit portion 49 of the inner casing 47. The guiding-and-fixing portions 72 project horizontally from the mounting portion 71, and are fixed to the light exit portion 49 of the inner casing 47 by screws (not shown), etc., so that the cross-dichroic prism 45 is fixed relative to the light exit portion 49 of the inner casing 47.

As shown in FIGS. 9 and 10, three liquid crystal panels 441R, 441G and 441B forming the electro-optical device 44 are supported by retaining frames 81 formed of a synthetic resin, and oppose three side surfaces, which are incidence surfaces, of the cross-dichroic prism 45. In addition, metal frame members 82 are attached to the three side surfaces, which are incidence surfaces, of the cross-dichroic prism 45. The retaining frames 81 and the frame members 82 are connected and fixed to each other by four fixing pins 83 formed of a transparent resin.

The retaining frames 81 are formed in a rectangular shape, and retain liquid crystal panels 441R, 441G and 441B at the periphery thereof. In addition, as shown in FIG. 11, each of the retaining frames 81 is provided with insertion holes 81A that receive the fixing pins 83 at four corners thereof.

As shown in FIGS. 10 and 11, each of the frame members 82 includes a top portion 82A, bottom portion 82B, and two side portions 82C, which are integrally formed by punching sheet metal, etc., in the shape of a rectangular frame. The side portions 82C are provided with film-receiving portions 821 to which the visual angle compensating film 419 is attached. The film-receiving portions 821 are formed by performing a draw processing of the side portions 82C at the midsection thereof, and project toward the liquid crystal panel 441. In addition, the film-receiving portions 821 are provided with receiving surfaces 821A, on which the visual angle compensating film 419 is attached. The receiving surfaces 821A are formed in a manner parallel to the incidence surface of the cross-dichroic prism 45, and the visual angle compensating film 419 is attached on both of the film-receiving portions 821 of the side portions 82C.

With respect to each of the frame members 82, the side surface, opposite to the side at which the visual angle compensating film 419 is attached, is fixed to the cross-dichroic prism 45. More specifically, the top portion 82A, the bottom portion 82B, and parts of the side portions 82C (parts excluding the film-receiving portions 821) are fixed to the incidence surface of the cross-dichroic prism 45 at the periphery thereof by an adhesive, etc. In an adhered state, the visual angle compensating film 419 and the incidence surface of the cross-dichroic prism 45 oppose each other with an air gap defined therebetween.

The peripheral size of the frame members 82 is larger than that of the side surfaces of the cross-dichroic prism 45. As shown in FIG. 10, the width a of the top portion 82A and the width b of the bottom portion 82B are larger than the width c of the side portions 82C. In addition, each of the frame members 82 is attached to the incidence surface of the cross-dichroic prism 45 in such a manner that most of the top portion 82A protrudes upward from the cross-dichroic prism 45, and most of the bottom portion 82B protrudes downward from the cross-dichroic prism 45. Thus, the top portion 82A and the bottom portion 82B protrude from the incidence surface of the cross-dichroic prism 45, and the protruding regions are used to attach adhering surfaces 833A, which will be described below, of the fixing pins 83. Accordingly, the size of the adhesion and fixing area between the fixing pins 83 and the frame members 82 may be increased, irrespective of the size of the cross-dichroic prism 45, by increasing the size of the protruding regions.

In addition, since the air gap is provided between the visual angle compensating film 419 and the cross-dichroic prism 45, the air permeability between the visual angle compensating film 419 and the cross-dichroic prism 45 is ensured.

Each of the fixing pins 83 includes a rod-shaped inserting portion 831 which is inserted through the insertion hole 81A of the retaining frame 81, a box-shaped exposed portion 832 which is disposed at an end of the inserting portion 831 and which is exposed outward when the inserting portion 831 is inserted, and an adhering portion 833 which is disposed at the other end of the inserting portion 831 and which is adhered on and is fixed to the frame member 82. The adhering portion 833 includes an adhering surface 833A, which is adhered on and is fixed to the frame member 82. The cross-section of the adhering portion 833, that is, the area of the adhering surface 833A, may be larger than the cross section of the inserting portion 831.

The above-described optical component constructed with the electro-optical device 44 and the cross-dichroic prism 45 is assembled by the following processes.

First, the liquid crystal panels 441R, 441G and 441B are attached to the retaining frames 81, and the frame members 82 are attached to the cross-dichroic prism 45. Then, the visual angle compensating films 419 are attached to the film-receiving portions 821 of the frame members 82 by an adhesive, etc., and the retaining frames 81 and the frame members 82 are connected to each other with fixing pins 83. An ultraviolet curing adhesive is applied on the inserting portions 831 and on the adhering surfaces 833A of the fixing pins 83, and the fixing pins 83 are inserted into the insertion holes 81A of the retaining frames 81. In addition, the adhering surfaces 833A of the fixing pins 83 are attached to the retaining frames 81 at four corners thereof (the above-described regions of the top portion 82A and the bottom portion 82B which protrude from the surface of the cross-dichroic prism 45). Then, after the positions of the liquid crystal panels 441R, 441G and 441B relative to the cross-dichroic prism 45 are adjusted, an ultraviolet ray is radiated toward the exposed portions 832 of the fixing pins 83, so that the adhesive is cured. Accordingly, the liquid crystal panels 441R, 441G and 441B are fixed to the incidence surfaces of the cross-dichroic prism 45.

According to the above-described embodiment of the present invention, the following advantages may be obtained.

(1) In the optical component constructed with the electro-optical device 44 and the cross-dichroic prism 45, the frame members 82 are attached to the cross-dichroic prism 45, and the retaining frames 81, which retain the liquid crystal panels 441R, 441G and 441B, are fixed to the frame members 82 with the fixing pins 83. Thus, it is not necessary to fix the fixing pins 83 directly to the cross-dichroic prism 45, and the cross-dichroic prism 45 is not required to have an area for fixing the fixing pins 83. Accordingly, the size of the cross-dichroic prism 45 may be reduced to the minimum size required from an optical point of view, and the size of the cross-dichroic prism 45 itself may be made to be small.

The top portion 82A and the bottom portion 82B of each of the frame members 82 are formed to be wider than the side portions 82C. In addition, the top portion 82A and the bottom portion 82B protrude from the incidence surface of the cross-dichroic prism 45, and the protruding regions are used to attach adhering surfaces 833A of the fixing pins 83. Thus, the size of the adhesion and fixing area between the fixing pins 83 and the frame members 82 may be increased, irrespective of the size of the cross-dichroic prism 45, by increasing the size of the protruding regions. Accordingly, sufficient fixation strength may be provided between the fixing pins 83 and the frame members 82, and the liquid crystal panels 441R, 441G and 441B are reliably fixed to the cross-dichroic prism 45.

(2) In each of the frame members 82, the width a of the top portion 82A and the width b of the bottom portion 82B are larger than the width c of the side portions 82C. In addition, most of the top portion 82A and the bottom portion 82B protrude from the surface of the cross-dichroic prism 45. Thus, the frame members 82 only slightly cover the surface of the cross-dichroic prism 45, and the area to adhere and fix the fixing pins 83 may be made large even when the cross-dichroic prism 45 is small. Accordingly, the fixing pins 83 may be reliably fixed relative to the cross-dichroic prism 45, so that the electro-optical device 44 is also reliably fixed relative to the cross-dichroic prism 45.

(3) Since the retaining frames 81, formed of a plastic, and the cross-dichroic prism 45, formed of an optical glass, which are commonly used in optical devices, such as projectors, are used, the optical component may be constructed economically. In addition, since the frame members 82 are formed by punching sheet metal, the frame member 82 having a desired shape may be easily obtained.

In addition, in the present embodiment, the retaining frames 81, formed of a synthetic resin, and the cross-dichroic prism 45, formed of an optical glass, are connected to each other via the frame members 82, formed of a metal having a coefficient of thermal expansion which is between the coefficients of thermal expansion of the synthetic resin and glass. Thus, even if heat occurs from the light source, etc., when the projector 1 is used, any impact caused by the difference in coefficients of thermal expansion between the cross-dichroic prism 45 and the retaining frames 81 may be compensated for to some extent by the frame members 82. Accordingly, the change in the relative position between the retaining frames 81 and the cross-dichroic prism 45 due to the difference in coefficients of thermal expansion may be suppressed.

(4) Since the frame members 82 are provided with the film-receiving portions 821, the visual angle compensating films 419 are easily attached to the frame members 82, and are easily disposed between the liquid crystal panels 441R, 441G and 441B and the cross-dichroic prism 45.

(5) Since the air gap is provided between the receiving surfaces 821A of the film-receiving portions 821 of the frame members 82 and the surfaces of the cross-dichroic prism 45, the visual angle compensating films 419 may be disposed relative to the cross-dichroic prism 45 with a predetermined clearance therebetween. Accordingly, the air permeability between the visual angle compensating films 419 and the cross-dichroic prism 45 may be ensured.

(6) By increasing the area of the adhering surfaces 833A of the fixing pins 83, which are adhered relative to the cross-dichroic prism 45, the adhesion strength between the fixing pins 83 and the frame members 82 may be increased.

(7) The optical component constructed with the electro-optical device 44 and the cross-dichroic prism 45 is assembled by using the above-described retaining frames 81, the frame members 82, and the fixing pins 83. Since the projector 1 of the present embodiment is constructed with the above-described optical component, the adhesion strength between the cross-dichroic prism 45 and the fixing pins 83 is sufficient. In addition, the projector 1 in which the size of the cross-dichroic prism 45 may be reduced is obtained. Accordingly, the size of the projector 1 may be reduced.

(8) Since the projector 1 is provided with the main power supply 31, which supplies electricity to the liquid crystal panels 441, each of the liquid crystal panels 441 is easily supplied with electricity.

The present invention is not limited to the above-described embodiment, and various modifications and enhancements may be applied within the scope of the present invention as long as the object of the present invention is substantially attained.

For example, in the above-described embodiment, the area of the adhering surfaces 833A, and the cross-section of the inserting portions 831 of the fixing pins 83, are the same. However, the present invention is not limited to this structure, and fixing pins 83A as shown in FIG. 12 may also be used. For the fixing pins 83A, the area of the adhering surfaces 833A is larger than the cross-sections of the inserting portions 831 and of the exposed portions 832. When the fixing pins 83A are used, the adhesion area between the fixing pins 83A and the frame member 82 is increased, and the adhesion strength therebetween is ensured.

In addition, in the above-described embodiment, the air gap, which has a size larger than a predetermined clearance, is formed between the receiving surfaces 821A of the film-receiving portions 821 and the cross-dichroic prism 45. Such an air gap, however, is not necessary as long as an air gap having an adequate size in accordance with the necessity of the air permeability is provided between a prism and an optical film.

In addition, in the above-descried embodiment, the visual angle compensating films 419 are provided as optical films. However, the optical film of the present invention is not limited to this structure. Various optical films, such as retardation films or polarization films, may also be used in accordance with the use of the optical component constructed with the electro-optical device and the prism.

In addition, although the frame members 82 are provided with the film-receiving portions 821 in the above-described embodiment, the frame member of the present invention may not be provided with the film-receiving portion. For example, when optical films, such as the above-described visual angle compensating films 419, are not disposed between the liquid crystal panels 441 and the cross-dichroic prism 45, the frame members 82 are not required to have the film-receiving portions 821.

In addition, in the above-described embodiment, the retaining frames 81 are formed of a plastic, the cross-dichroic prism 45 is formed of an optical glass, and the frame members 82 are formed of a metal. However, the retaining frames 81, the cross-dichroic prism 45, and the frame members 82 may also be formed of other materials which are adequately chosen in consideration of workability, economical efficiency, etc.

In addition, in the above-described embodiment, the projector 1 includes three light modulation devices. The present invention, however, may also be applied to projectors including only one light modulation device, projectors including two light modulation devices, and projectors including four or more light modulation devices. Furthermore, although liquid crystal panels are used as the light modulation devices in the above-described embodiment, light modulation devices which are not liquid crystal panels, for example, devices using micro mirrors, may also be used. Furthermore, although the transmission light modulation devices, in which the incidence surface and the exit surface are different, are used in the above-described embodiment, reflection light modulation devices, in which the incidence surface and the exit surface are the same, may also be used. Furthermore, in the above-described embodiment, the projector 1 is a front-type projector, in which images are projected in the direction in which a screen is provided and the images are viewed on the screen. However, the present invention may also be applied to a rear-type projector, in which images are projected in the direction opposite to the direction in which images are viewed on the screen.

According to the present invention, the frame member is attached to the prism, and the retaining frame, which retains the light modulation device, is attached to the frame member with the fixing pin. Thus, the surface of the prism is not required to have an area for fixing the fixing pin, and the size of the prism may be reduced to the minimum size required from an optical point of view. In addition, since the fixing pin is fixed to the frame member, the fixing area between the fixing pin and the frame member may be increased by increasing the size, especially the width, of the frame member. Thus, the light modulation device may be reliably fixed relative to the prism.

What is claimed is:

1. An optical component, comprising:
   a light modulation device;
   a retaining frame which retains said light modulation device;
   a prism having a surface;
   a fixing pin that fixes said retaining frame to said prism, the fixing pin having one end and another end, the one end of the fixing pin being fixed to the retaining frame; and
   a frame member which is attached directly to the surface of said prism, the other end of the fixing pin being fixed to the frame member,
   the fixing pin having a function as a fixing mechanism for adjusting the positions of the light modulation device to the prism.

2. The optical component according to claim 1, a peripheral size of said frame member being larger than the surface of said prism to which said frame member is attached.

3. The optical component according to claim 1, said retaining frame being formed of a synthetic resin, said prism being formed of an optical glass, and said frame member being formed of a metal.

4. The optical component according to claim 1, said frame member being provided with a film-receiving portion to which an optical film is attached.

5. The optical component according to claim 4, an air gap being defined between a surface of said film-receiving portion to which said optical film is attached and the surface of said prism to which said frame member is attached.

6. A projector, comprising:
   a light modulation device which modulates a plurality of colored lights in accordance with image information;
   a prism which synthesizes the lights modulated by said light modulation device; and
   the optical component according to claim 1,
   wherein the lights synthesized by said prism are enlarged and projected so as to form a projection image.

7. The projector according to claim 6, further comprising a power source which supplies electricity to said light modulation device.

8. The optical component according to claim 6, a peripheral size of said frame member being larger than the surface of said prism to which said frame member is attached.

9. The optical component according to claim 6, said retaining frame being formed of a synthetic resin, said prism being formed of an optical glass, and said frame member being formed of a metal.

10. The optical component according to claim 6, said frame member being provided with a film-receiving portion to which an optical film is attached.

11. The optical component according to claim 10, an air gap being defined between a surface of said film-receiving portion to which said optical film is attached and the surface of said prism to which said frame member is attached.

12. An optical component, comprising: a light modulation device; a retaining frame which retains said light modulation device; a prism; and a fixing pin that fixes said retaining frame to said prism, the fixing pin having one end and another end, the one end of said fixing pin being fixed to said retaining frame, the other end of said fixing pin being fixed to a frame member which is attached directly to said prism, and a cross-section of the other end of said fixing pin being larger than a cross-section of the one end of said fixing pin.

13. A projector, comprising:
   a light modulation device which modulates a plurality of colored lights in accordance with image information;
   a prism which synthesizes the lights modulated by said light modulation device; and
   the optical component according to claim 12,
   wherein the lights synthesized by said prism are enlarged and projected so as to form a projection image.

14. The projector according to claim 13, further comprising a power source which supplies electricity to said light modulation device.

* * * * *